O. RÖSSLER.
DIVIDING HEAD.
APPLICATION FILED MAY 11, 1911.

1,067,682.

Patented July 15, 1913.
2 SHEETS—SHEET 1.

Witnesses:
C E Parsons
Ewd L Tolson

Inventor:
Oswald Rössler
By Spear Middleton Donaldson & Spear
Atty's

O. RÖSSLER.
DIVIDING HEAD.
APPLICATION FILED MAY 11, 1911.

1,067,682.

Patented July 15, 1913.
2 SHEETS—SHEET 2.

Attest:
Ewd L Folson
Edward N Saxton

Inventor,
Oswald Rössler,
by Spear, Middleton, Donaldson & Spear
Attys.

UNITED STATES PATENT OFFICE.

OSWALD RÖSSLER, OF BERLIN, GERMANY.

DIVIDING-HEAD.

1,067,682.  Specification of Letters Patent.  Patented July 15, 1913.

Application filed May 11, 1911. Serial No. 626,560.

*To all whom it may concern:*

Be it known that I, OSWALD RÖSSLER, subject of the King of Saxony, residing at Berlin, Germany, have invented certain new and useful Improvements in Dividing-Heads, of which the following is a specification.

The subject matter of the present application consists in a universal dividing head with automatic drive, by means of which any milling machine can be converted into a completely automatic machine.

The dividing head belongs to that class of dividing mechanisms, in which the controlling and dividing elements are located in the dividing head casing itself.

The essential feature of the invention consists in the particular arrangement of the drive and of the elements, by means of which the controlling and dividing movements are performed.

The invention is illustrated in the accompanying drawings, in which—

Figure 1:
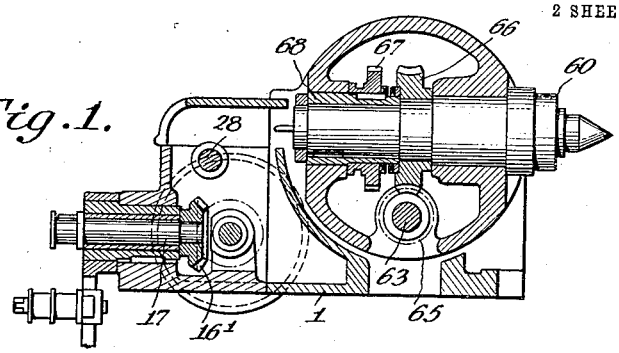
Figure 2:
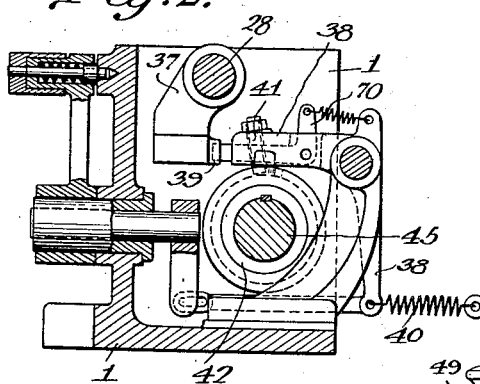
Figure 3:
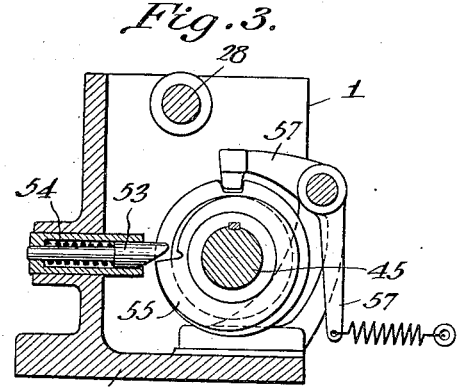
Figure 4:
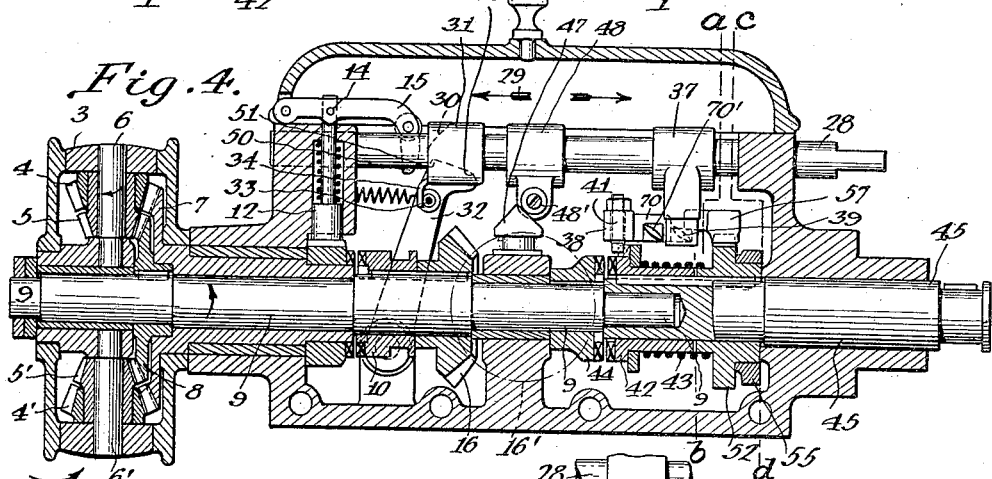
Figures 5, 5A:
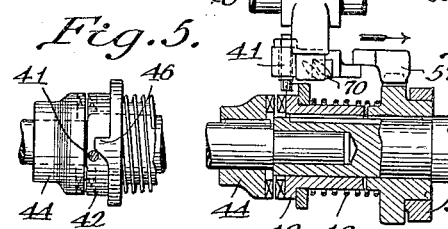
Figure 6:
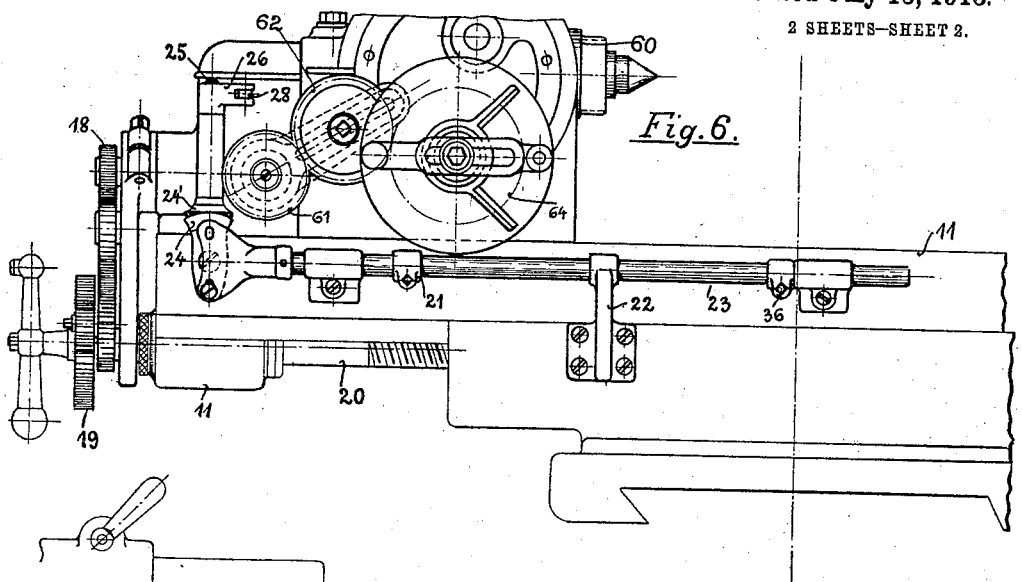
Figure 7:
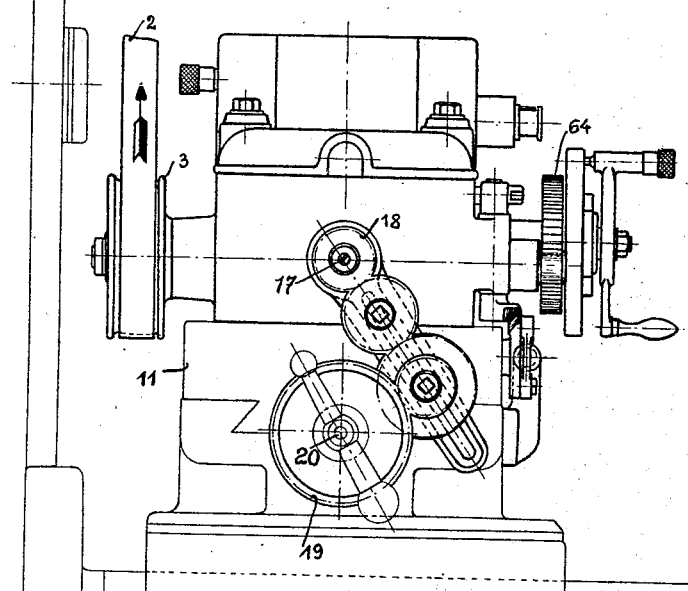

Figure 1 is a side view in section in the direction of the work spindle; Fig. 2 represents a section through the work spindle taken on the line *a b* of Fig. 4; Fig. 3 is a section on the line *c d* of Fig. 4; Fig. 4 is a longitudinal vertical view through the indexing shafts; Fig. 5 represents a clutch in elevation, and Fig. 5ª the same in section, while Fig. 6 represents a portion of the sliding table with the dividing head, and Fig. 7 shows the dividing head in rear view.

The index mechanism and the dividing head are journaled in a common housing 1, which is secured in a suitable manner upon the sliding table, so that the gear of the index mechanism meshes with the gear of the feeding spindle of the machine, by which the table is moved.

The mechanism is driven by a belt 2 mounted on the pulley 3. Within said pulley is mounted a planetary gear mechanism, the object of which is to accelerate the return movement of the table, the same consisting of the gears 4, 4' and 5, 5', which are rotatably mounted on the bolts 6, 6'. The arrangement is such that the gears 4, 4', mesh with the bevel gear 7 and the gears 5, 5' with the bevel gear 8. The latter is fast on the shaft 9, while the bevel gear 7 is loose on said shaft but can be secured thereto by a clutch 10.

In the forward feed of the table 11, the bevel gear 7 is held stationary by a catch-pin 12, acted upon by a spring 13 and having a pivotal connection at 14 with a rocking lever 15. Since the gears 4 and 5 and 4', 5' are rigidly connected together, when the pulley 3 is rotated, the bevel gear 7 being held stationary, the gear 8 and shaft 9 are slowly rotated for the feed movement. The shaft 9 transmits its rotation to the shaft 17 through the bevel gears 16, 16'. Shaft 17 is provided at its outer end with a change gear 18, which drives the gear 19 and thereby the table feed screw 20, through intermediate gears. As soon as the dog 21 on the reversing rod 23 strikes against the stop 22, the movement of said rod is arrested and the shaft 25 with the lever 26 is turned, through the connection 24, 24'. The lever 26 causes the rod 28 to move in the direction of the arrow 29; this causes the lever 15 to be raised by contact of its end with the cam surface 30, formed on the block 31. The catch-pin 12 is thereby raised, freeing the bevel gear 7.

The clutch 10 is provided with a lever 32, the pin 33 of which bears against a lug 34 on the rod 28. As soon as the latter is moved in the direction of the arrow 29, the lug 34 releases the lever 32, whereby the latter can swing to the left under the influence of the spring 35, putting clutch 10 in engagement with the gear 7. This produces the rapid return stroke, since the gear 7 is free, so that it and the shaft 9 rotate at the same velocity as the pulley 3. The return stroke is completed as soon as the dog 36 strikes against the stop 22, which, through the reversing rod 23, causes the rod 28 to be moved in the opposite direction. By this movement of the rod 28, the lever 15 and therewith the catch-pin 12 are released, so that the latter again holds the gear 7 stationary. At the same time a lever 38 is raised against the action of a spring 40 by the inclined surface 39 of the dog or block 37 engaging the inclined surface 70' on lever 70 carried by said lever 38. As will be seen from the drawing, the lever 70 will permit the incline 39 to move in the direction of the arrow 29 without operating the lever 38, but when the incline 39 reaches the position shown in Fig. 5ª and starts moving toward the right, the lever 70 is raised and it in turn raises the lever 38. A coupling sleeve 42 bears against the pin 41 of the lever 38. As soon as the latter is raised, the said coupling sleeve is liberated, so that, under the influence of a spring 43, it is moved in the direction of the arrow 29 and comes into engagement with a clutch sleeve 44 fast on the shaft 9. The result is that the shaft 45 is coupled with the shaft 9. As soon as the shaft 45 has made a complete rotation, the coupling sleeve 42 will be pushed back into its normal position by a lug 46, which bears against the pin 41, whereby the shaft 45 is again disconnected from the shaft 9. This completes one cycle of operations, and the slow forward stroke of the table commences again. In order to insure the movement of the rod 28 in both directions, a spring block 47 is provided, which bears against an adjustable dog 48 carrying a roller 48' secured to the shaft 28. Both levers 15 and 32 are so arranged that they both are in their extreme positions at the same time, so that only one of them can be in the coupling position at any one time. For this purpose, the lever 32, by which the clutch 10 is actuated, is provided at its upper end with a curved surface 49, which, as soon as the lever comes into the position of engagement and the clutch is thrown in, comes under a lug 50 on the lever 15, so that the latter cannot swing downwardly. On the other hand, when the lever 15 is in its lower position, whereby the catch-pin 12 has locked the wheel 7, the shoulder 51 lies in the path of the lug 50 and thereby prevents the lever 32 from swinging back (see Fig. 4).

In order that shaft 45, after having performed the indexing, may be surely held in its position during the slow forward feed, the following latch elements are provided: Besides lever 57, which engages in the notch disk 52 mounted on the shaft 45, and released by an extension of lever 70, a wedge-shaped pin 53 is slidably mounted in the casing 1 under the influence of a spring 54 which presses it against the edge of a curved disk 55 mounted adjacent to the notch disk 52. As soon as the shaft 45 has reached its end position, the pin 53 passes off the shoulder 56 of the curved disk 55 and thereby holds the shaft 45 (see Fig. 3.) The backward movement of the pin 53 is caused by the spirally-shaped disk 55.

In order to transmit the indexing movement of the shaft 45 to the work spindle 60, a change gear 61 is secured on the outer end of said shaft, which gear actuates a gear 64, mounted on the shaft 63, through a change gear 62. A worm 65 meshes with a worm gear 66, loose on the work spindle. The gear 66 is adapted to be engaged with the gear 67, which is secured upon a sleeve 68 fast on the work spindle. The index movement of the work spindle can be properly regulated by changing the gears 61, 62, and 64, so that the work spindle may receive any desired index movement. This arrangement is old in itself, so that it is unnecessary to explain it in greater detail.

I claim as my invention:

1. A dividing head comprising a sliding table, a feed spindle therefor, indexing mechanism carried by the table, a shaft for said mechanism, gears connecting the shaft with the feed spindle, a sleeve on the shaft, a clutch for connecting the sleeve to the shaft, a spring pressed pin for holding the sleeve stationary, means for giving the shaft a slow rotation in one direction when the sleeve is held stationary, and a rapid rotation in the other direction when the sleeve is released, means controlled by the movement of the table for releasing the sleeve and throwing in the clutch, said means comprising a lever 15 connected to the pin and a lever 32 connected to the clutch, and a sliding rod operated by the movement of the table and having a cam surface thereon for raising the lever 15 and moving the lever 32.

2. In a device of the class described, the combination of a sliding table, a driven shaft for moving the table, a driven sleeve on the shaft, a clutch connecting the sleeve to the shaft, a pin for normally holding the sleeve stationary, a lever 15 connected to said pin, a lever 32 tending to close the clutch, a sliding rod, means thereon for raising the lever 15 to raise the pin to release the sleeve, and for releasing the lever 32 to allow the clutch to engage the sleeve, and projections on said levers for locking each other in their end positions.

In testimony whereof, I affix my signature in presence of two witnesses.

OSWALD RÖSSLER.

Witnesses:
HENRY HASPER,
WOLDEMAR HAUPT.

---

Copies of this patent may be obtained for five cents each, by addressing the "Commissioner of Patents, Washington, D. C."